United States Patent [19]

Krause et al.

[11] Patent Number: 4,575,046
[45] Date of Patent: Mar. 11, 1986

[54] VALVE SEAT RETAINER HAVING A FULL UNINTERRUPTED GASKET FACE

[75] Inventors: Bernd Krause, Cincinnati; Wayne L. Hoelscher, West Chester; William F. Scroggin, Cincinnati, all of Ohio

[73] Assignee: Xomox Corporation, Cincinnati, Ohio

[21] Appl. No.: 595,839

[22] Filed: Apr. 2, 1984

[51] Int. Cl.⁴ .............................................. F16K 1/22
[52] U.S. Cl. .................................. 251/316; 251/306; 251/360; 251/363; 137/315; 137/15; 403/348
[58] Field of Search ............... 251/306, 305, 307, 315, 251/316, 317, 360, 363; 137/315, 15; 403/348, 349, 356; 29/157.1 R; 285/408, 412

[56] References Cited

U.S. PATENT DOCUMENTS

| | | | |
|---|---|---|---|
| 2,571,352 | 10/1951 | Fast | 403/356 |
| 3,269,691 | 8/1966 | Meima et al. | 251/316 |
| 3,937,441 | 2/1976 | Baumann | 251/315 |
| 4,258,901 | 3/1981 | Zinnai et al. | 251/315 X |
| 4,289,296 | 9/1981 | Krause | |
| 4,399,833 | 8/1983 | Holtgraver | |
| 4,508,315 | 4/1985 | Livorsi et al. | 251/307 X |

OTHER PUBLICATIONS

Brochure of ITT Grinnell Valve Co., Inc., entitled "Dyna-Lok High Performance Butterfly Valves"; 9/1980.
Fisher Type 8555 Eccentric Disc Control Valves, Bulletin 51.6:8555, pp. 1 and 2; 1981.
Flexitallic Gasket Company, Inc., Bulletin 171, 1976, Second Edition.
Valtek Brochure.
Brochure of British Company Charles Winn Limited, entitled "Winn Replaceable Seat Butterfly Valves"; 1978.

Primary Examiner—A. Michael Chambers
Assistant Examiner—John C. Fox
Attorney, Agent, or Firm—Frost & Jacobs

[57] ABSTRACT

A recessed seat retainer for a valve is secured in an annular recess on the face of a valve body by a totally internally disposed key system which does not create an external leak path. An annular keyway is formed in the cylindrical sidewall of a seat retainer. A key extends from the cylindrical sidewall of an annular recess formed in an axial face of the valve body. The key is received in the keyway and locks the retainer against axial dislodgement from the valve body.

9 Claims, 6 Drawing Figures

VALVE SEAT RETAINER HAVING A FULL UNINTERRUPTED GASKET FACE

TECHNICAL FIELD

The invention relates generally to valves and more particularly concerns a seat retainer for a valve which offers a full uninterrupted gasket face for minimizing leakage at the interface of an adjacent fluid handling component. The invention will be specifically disclosed in connection with a recessed seat retainer secured to a valve body by an internally disposed key assembly arranged to firmly, but releasably, secure the seat retainer to the valve body without creating external fluid leak paths.

BACKGROUND OF THE INVENTION

In many fluid handling systems, considerable precautions are taken to prevent leakage of fluid from the system to the ambient environment. In addition to the loss of the fluid itself, fluid leakage may result in explosions, fires, environmental contamination, and/or increased maintenance costs. Concerns about fluid leakage are particularly pronounced when the fluid being handled is corrosive or toxic.

One of the most likely locations for leakage in a fluid handling system is at the joint between the system components. In a valved piping system, one of the most troublesome leak locations is the interface between a valve and an adjacent system component, such as a pipe flange. In order to enhance sealing and minimize fluid leakage, a gasket is almost always interposed between adjacent system components.

When the fluid in the handling system is at an extreme temperature or pressure or when the fluid is corrosive or toxic, the most preferred and efficient type of gasket is a spiral wound type. A spiral wound gasket consists of preformed metal strips wound in a spiral with a selected filler material interposed and laminated between the metal strips. The filler material may be selected to meet the specific requirements of the system and the handled fluid. Common filler materials include asbestos materials, graphite and polytetrafluoroethylene (PTFE).

A valve seat is commonly secured relative to a valve body by a seat retainer, which retainer is securely fastened to the valve body to compressingly engage the interposed valve seat. By far the most prevalent method of fastening a seat retainer to a valve body is through the employment of screws which extend through screw holes in the retainer and are threadably received by bores in the valve body.

The existence of screw holes in a gasket face of a retainer poses significant limitations upon the effectiveness of a spiral wound gasket. Spiral wound gaskets tend to collapse into the voids created by the screw holes and do not adequately seal the voids. As a result, external leak paths for the fluid are created. Furthermore, the collapse of one or more spirals of a spiral wound gasket into a screw hole void has a domino effect upon the adjacent spirals. Thus, a leak path is created not only at the screw hole location, but also at adjacent areas.

The sealing band width of a spiral wound gasket is frequently less than the width of the retainer face and, for some valve sizes, it is possible to avoid the above mentioned problems by locating the screw holes either radially inside or radially outside this sealing band. However, locating the screw holes inside the sealing band decreases the area of the fluid flow path for many valves, reducing fluid flow through the valve and making the valve less efficient. Locating the screw holes outside the sealing band results in totally unsealed leak-paths through the screw holes.

Several prior art attempts have been made to eliminate retainer screw holes and to provide a full uninterrupted retainer face suitable for spiral wound gaskets. In one prior art design, the retainer is provided with a plurality of spaced lugs extending radially outward from the outer periphery of the retainer. These lugs have screw holes for receiving screws to hold the retainer to the valve body. Although the screw holes of such designs inherently have voids, just as the more conventional screw fastened retainers, the screw holes are located radially outside the retainer-gasket interface.

Unfortunately, such radially extending lug designs have several limitations. First of all, the valve seat closure member exerts a considerable force upon the valve seat. The seat, in turn, transmits this force to the retainer. Thus, when the retainer is fastened to the valve body only about the outer periphery of the retainer, the retainer becomes a relatively lengthy moment arm and is subject to excessive flexure. In order to avoid excessive flexure, such retainers must be relatively thick (have a relatively large axial dimension). As a result, standard valves having such retainers will not meet industry standards for end to end dimensions. Additionally, retainers of this prior art design cannot be recessed and, in effect, produce a valve with a split body having a potential leak path to the external environment around the entire circumference of the fluid flow path.

Another prior art approach is discussed in U.S. Pat. No. 4,399,833 to Holtgraver. The valve body discussed in the Holtgraver patent has lugs circumferentially spaced along the outer peripheral surface. The lugs have threaded bore holes, which receive screws for securing an interchangeable adapter plate adapted to connect the valve body to one of several types of pipe flange fittings. The adapter plate also overlies the outer periphery of the seat retainer and secures the seat retainer relative to the valve body. This adapter plate method of securing a retainer thus suffers from the same limitations as the radially extending lug designs discussed above.

In another prior art attempt to secure a seat retainer to a valve body while providing a full gasket face, threaded bores have been drilled radially inwardly through the valve body and into a central recess disposed about the flow passage. Set screws were then externally introduced through the threaded bores and extended into V-shaped grooves in the outer diameter of a retainer positioned in the recess. The set screws were then operative to hold the retainer in the recess. Although using a recessed retainer is highly advantageous, drilling holes through the valve body creates an additional leak path for the handled fluid.

In yet another prior art attempt to remedy the problems discussed above, a seat retainer is held in place on a valve body by a snap ring assembly. Snap ring assemblies have proved satisfactory for securing the retainer to the valve body during shipment. Further, snap ring assemblies are satisfactory in actual usage when the valve is sandwiched between two pipe flanges. So long as the retainer is compressingly interposed between the valve body and an adjacent pipe flange, there is no opportunity for the retainer to separate from the valve body.

However, it is common commercial practice to "bench test" valves prior to installing the valves in a fluid handling system. Bench testing is a common practice for calibrating an actuator for moving a valve. When a retainer is secured to a valve body by only a snap ring assembly, there is a significant danger that the force applied by the valve closure member during valve closing will apply a sufficient force to release the retainer from the valve body. In such an occurrence, the retainer is forcefully ejected from the valve body and becomes a highly dangerous projectile.

Moreover, difficulties are experienced in removing retainers secured by snap rings, such as for the replacement of a valve seat. It is common practice to position a screw driver between the valve seat and the retainer to pry a snap ring secured retainer from a valve body. However, such a procedure is likely to damage the seat, particularly if the seat is formed of a "soft" material.

Additionally, valves are occasionally used in dead end service at the end of a process line. In such a use, one face of the valve will not be abutted by an adjoining pipe flange. Thus, if the seat retainer is positioned on the exterior side of a dead end line and secured by only a snap ring assembly, the holding force of the snap ring assembly may be overcome and, the retainer may once again become a potentially dangerous projectile. Dislodgement of the retainer also frees the valve seat and results in gross leakage.

SUMMARY OF THE INVENTION

Accordingly, it is a primary object of the present invention to provide a valve with a seat retainer which minimizes fluid leakage in a valved fluid handling system.

It is another object of the invention to provide a removable seat retainer for a valve which is both firmly fitted to the valve and which offers a full uninterrupted face for interfacing with a gasket.

Another object of the invention is to provide a securely fastened seat retainer for a valve which is suitable for sealingly interfacing with a spiral wound gasket.

A further object of the invention is to provide a seat retainer having an uninterrupted face which is securely affixed to a valve body during bench testing.

A still further object of the invention is to secure a valve seat retainer with an uninterrupted gasket face to a valve body at a location proximal to the resultant force exerted upon the retainer during valve operation in order to minimize any flexure of the retainer.

It is yet another object of the invention to provide a valve seat retainer with an uninterrupted gasket face which has potential for dead end service irrespective of valve orientation.

Additional objects, advantages, and other novel features of the invention will be set forth in part in the description that follows and in part will become apparent to those skilled in the art upon examination of the following or may be learned with the practice of the invention. The objects and advantages may be realized by means of the instrumentalities and combinations particularly pointed out in the appended claims.

To achieve the foregoing and other objects, and in accordance with the purposes of the present invention as described herein, an improved valve is provided for minimizing fluid leakage at an interface with an adjacent fluid handling component. The body of the valve has first and second axial ends with a fluid flow passage extending through the body from one axial side to the other. An annular recess in the first axial side of the valve body circumscribes the fluid flow passage, the annular recess including an axial end wall and a cylindrical sidewall. A closure member is disposed within the valve body and is movable between open and closed positions for selectively blocking fluid flow through the fluid passage.

A valve seat is disposed in the annular recess about the fluid flow passage. The closure member sealingly engages a valve seat when the closure member is in the closed position. A seat retainer is selectively securable in the annular recess to interpose the valve seat between the seat retainer and the valve body. The seat retainer has an axial end wall and a cylindrical sidewall.

In accordance to the broad aspects of the invention, one of the seat retainer walls has an annular keyway. At least one key member extends radially inward from a wall of the annular recess into the annular keyway for holding the seat retainer in the annular recess and securing the valve seat relative to the valve body. This at least one key member is mounted in the annular recess without creating an external leakpath for a fluid media in the fluid flow passage.

In accordance with a more specific aspect of the invention, a closed ended keyseat is formed in the cylindrical sidewall of the annular recess. The key member is then disposed in the keyseat and extends radially inwardly into the annular keyway.

In a still further aspect of the invention, the annular keyway is at least partially defined by an axially outboard keyway sidewall and an axially inboard keyway sidewall. The axially inboard keyway sidewall has a circumferential opening dimensioned to axially receive the portion of the key member extending into the annular recess and is adapted for engagement with the axial endwall of the annular recess.

In one preferred aspect of the invention, the key member is a Woodruff key, and the keyseat has a semicircular configuration.

In yet another aspect of the invention, the first axial side of the valve body is substantially planar and the axially outboard side of the seat retainer lies in substantially the same plane as the first axial side of the valve body when the key member is disposed in the annular keyway.

In another preferred aspect of the invention, the seat retainer has a ring-like configuration, and the axially outboard side of the seat retainer is uninterrupted by aperture voids.

In an alternate aspect of the invention, the key member has a cylindrical configuration and the keyseat is a closed ended cylindrical bore extending radially into the valve body.

In another aspect of the invention, a method is provided for securing a recessed seat retainer in an annular recess of a butterfly valve. The method includes forming a closed ended keyseat in the annular recess so that the keyseat opens only to the annular recess. A key is then placed in the keyseat and extended into the annular recess. An annular keyway is then formed in the seat retainer, and a circumferential portion of a keyway sidewall is removed to provide an opening for inserting the key into the keyway. The seat retainer is then aligned relative to the valve body to bring the opening on the keyway sidewall in registry with the key. The seat retainer is then moved axially relative to the annular recess to position the key in the keyway. The seat retainer engages a valve seat interposed between the seat retainer and the valve body. After the key and key opening are in registry and the key is positioned in the keyway, the seat retainer is rotated relative to the valve body to bring the key opening out of alignment with the key whereby the seat and the seat retainer are secured from axial dislodgement from the valve body.

In a further aspect of the method of the invention, the keyseat is formed in a circumferential sidewall of the annular recess, and the key is extended radially into the annular recess.

In a still further aspect of the method of the invention, a semi-circular keyseat is formed, and the key is a Woodruff key inserted into the keyseat.

Still other objects of the present invention will become readily apparent to those skilled in this art from the following description wherein there are shown and described some preferred embodiments of this invention, simply by way of illustration, of several of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description serve to illustrate the principles of the invention. In the drawings.

Reference will now be made in detail to the present preferred embodiment of the invention, an example of which is illustrated in the accompanying drawings.

DETAILED DESCRIPTION OF THE PREFERRED EMBODIMENT

Figure 1:
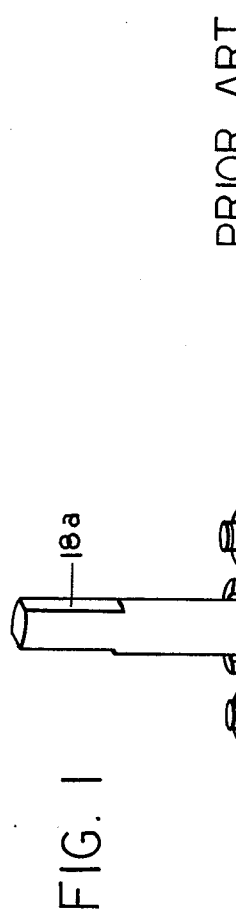
FIG. 1 is a perspective view of a lug style butterfly valve with a sector cut away, illustrating a typical prior art seat retainer for securing a valve seat in a valve body and showing fastening screws extending through the retainer into the valve body.

Referring now to the drawings, FIG. 1 shows a prior art high performance butterfly valve, generally designated by the numeral 10. The illustrated valve 10 has a lug style body 12 having first and second axial sides 12a, 12b with a plurality of spaced radially extending lugs 12c. Each lug 12c has an aperture 12d extending through the body 12 from one axial side 12a to the other (12b). A centrally disposed bore 14 also extends through the body 12 and serves as a fluid flow passage for a fluid media being controlled by the valve 10.

A closure member, specifically illustrated as a disc 16, is pivotally mounted in the bore 14 for selectively opening and closing the fluid flow passage through the body 12 and controlling the flow of fluid media therethrough. The disc 16 is mounted on the outer surface of a shaft 18, which shaft 18 extends radially through the bore 14 and outwardly through the body 12 where it interfaces with an actuator (not shown). The non-illustrated actuator engages flats 18a on the outboard end of shaft 18 and is operative to rotate the shaft 18 which, in turn, pivots the disc 16 between open and closed positions in a manner well known in the art.

The disc 16, which is shown in a partially open position in FIG. 1, has a spherical sealing surface 16a about its periphery. When the disc 16 is moved to a closed position to completely block fluid flow through the bore 14, the sealing surface 16a sealingly contacts an annular seat member 20 extending radially into the bore 14. The seat member 20 is secured in a recess 22 and positioned to be in radial alignment with the disc 16 when the disc 16 is in the closed position. The recess 22 is jointly formed by a seat retainer 26 and an annular cavity 25 counterbored into an annular recess 24 in the first axial side 12a of the body 12. The illustrated seat 20 is a bidirectional axially pliant pressure assisted seat such as disclosed in U.S. Pat. No. 4,289,296 to Krause. The seat retainer ring 26 has an axial endwall 26a and an outer cylindrical sidewall 26b which respectively engage an axial endwall 24a and a cylindrical sidewall 24b of the annular recess 24. A plurality of circumferentially spaced screws 30 selectively secure the seat retainer 26 to the body 12. The spaced screws 30 of FIG. 1 extend axially through apertures 27 in the retainer ring 26 and are received by threaded bores 29 (not shown in FIG. 1, see FIG. 2) in the body 12.

Figure 2:
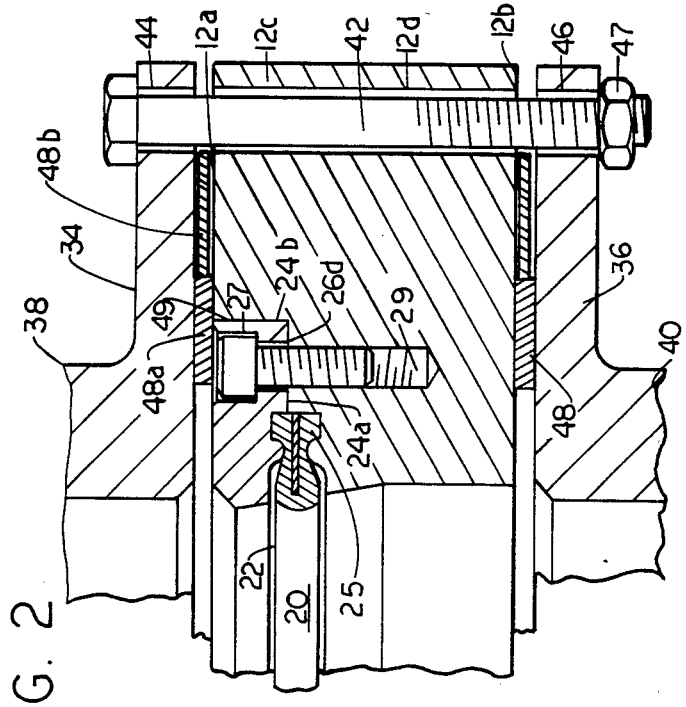
FIG. 2 is a fragmentary cross-sectional view of the prior art valve of FIG. 1 depicting the valve in interposed relationship to two pipe flanges.

As most clearly depicted in the illustration of FIG. 2, the body 12 is adapted to be interposed between a pair of flanges 34 and 36, which may, for example, be the ends of a corresponding pair of pipes 38 and 40. In the illustrated arrangement, bolts 42 (only one of which is shown in FIG. 2) extend through the apertures 12d in the body lugs 12c as well as through aligned apertures 44 and 46 in the respective flanges 34 and 36. The bolts 42 support the valve body 12 in the space between the flanges 34,36 and, with the aid of nuts 47, apply a compressive force between the flanges 34,36 and the valve body 12.

In order to enhance the sealing relationship between the valve 10 and the adjacent pipes 38 and 40, gaskets 48 are positioned on both axial sides of the valve 10 and are interposed between the flanges 34,36 and valve body 12. The gaskets 48 illustrated in FIG. 2 are of the spiral wound type wherein metal strips are wound in a spiral and laminated with a selected interposed filler material. Spiral wound gaskets of this type are commercially available and are highly preferred in many applications when the fluid media being controlled by the valve 10 is toxic or corrosive or at extreme temperatures or pressures. The illustrated gaskets 48 include radially inwardly disposed spiral wound sections 48a and radially outwardly disposed solid metal outer ring sections 48b. The solid ring outer ring sections 48b are formed of an appropriate fluid media matched metal and function to limit axial compression of the radially inward gasket section 48a. The solid metal outer ring sections 48b also prevent blowout of the spiral wound section 48a and assist in properly centering the gasket 48 relative to the flanges 34,36 and the valve body 12.

Recessed type seat retainers 26, such as depicted in the illustrated valve 10 are strongly preferred over face mating type retainers when expensive or potentially hazardous fluids are being controlled by a valve. Face mating type retainers effectively produce a split valve body, and, as a result, provide a potential fluid leak path between the body and retainer to the external environment. When a recessed retainer type valve is being used, it is highly desirable to engage the interface between the valve body and the outer diameter of the seat retainer with the flange gasket to seal off all potential avenues of external leakage. When the gasket is of the spiral wound type, this objective is best achieved by engaging the spiral wound portion 48a of the gasket with the interface 49 of the retainer 26 and the valve body 12.

FIG. 2 depicts the relationship between a preferred type of spiral wound gasket 48 and the prior art butterfly valve of FIG. 1. It is seen that spiral wound portion 48a of the gakset 48 desirably overlaps the valve 10 at the retainer-body interface 49. However, the continuity of the outboard face of the retainer 26 is interrupted by screw apertures 27 and the spiral wound gasket portion also extends over these apertures 27. The voids created by the screw apertures 27 prevent adequate sealing between the retainer 26 and the gasket 48 at these locations. Moreover, the spiral wound metal strips in the gasket portion 48a tend to collapse into the voids of the apertures 27, further reducing the sealing effectiveness of the gasket 48. In addition, the collapse of the spiral wound metal strips tends to create a cascading effect in which even those portions of the spiral wound metal strips outside the aperture voids are misaligned from their sealing relationship with the valve 10. As a result of such collapsing and cascading of the spiral wound gasket portions 48a, external leak paths for the fluid media being controlled by the valve 10 are created. For these reasons, the most preferred type of gasket, the spiral wound gasket is unsuitable for use with many sizes of prior art valves.

Figure 4:
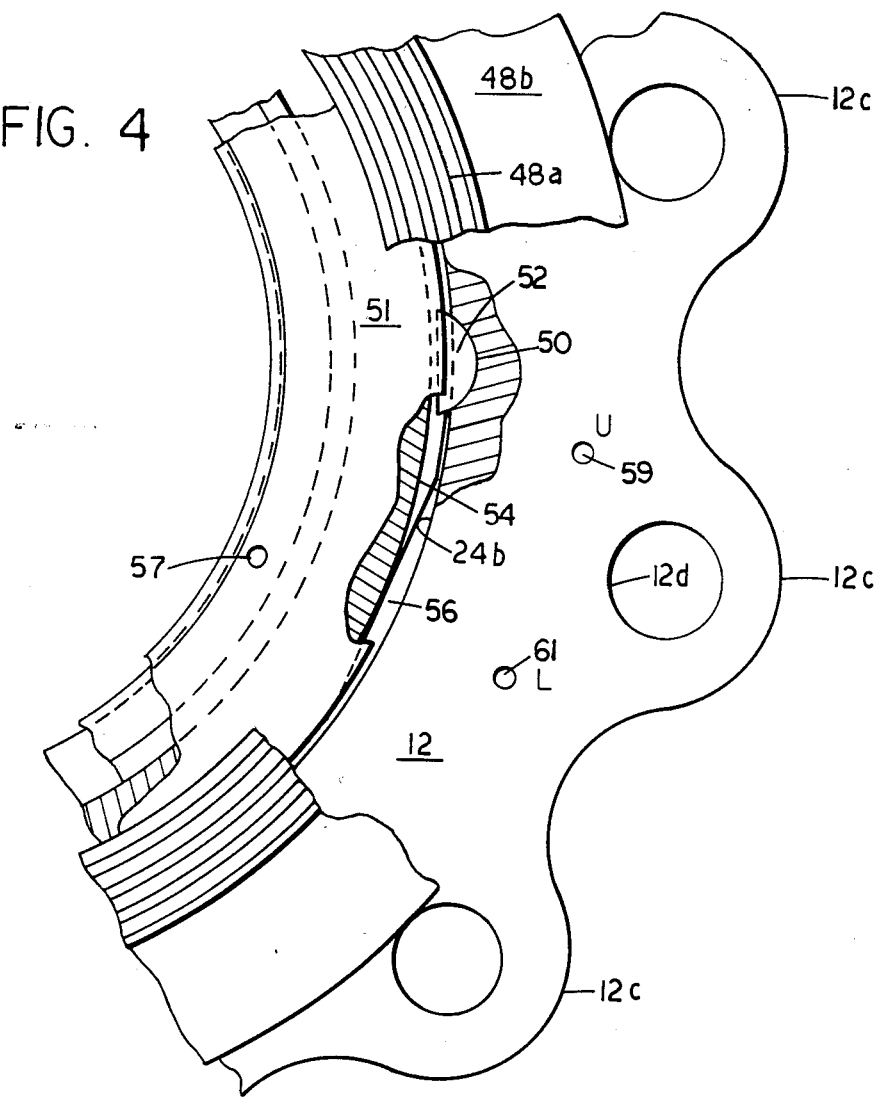
FIG. 4 is a fragmentary elevational view, partially in cross-section, of the retainer face side of the valve of FIG. 3 showing the key assembly and the uninterrupted face of the seat retainer.

Referring now to FIG. 4, a fragmentary view of the valve 10 with an improved retainer 51 constructed in accordance with the present invention is shown from the retainer side. A plurality of spaced semi-circular keyseats 50 (only one of which is illustrated) are machined in the cylindrical sidewall 24b of the annular recess 24. A Woodruff key 52 is fitted in each of the semi-circular keyseats 50, and these Woodruff keys 52 extend radially inwardly into the annular recess 24. An annular keyway 54 is also machined about the outer diameter of the seat retainer 51 for accommodating the Woodruff keys 52.

Figure 3:
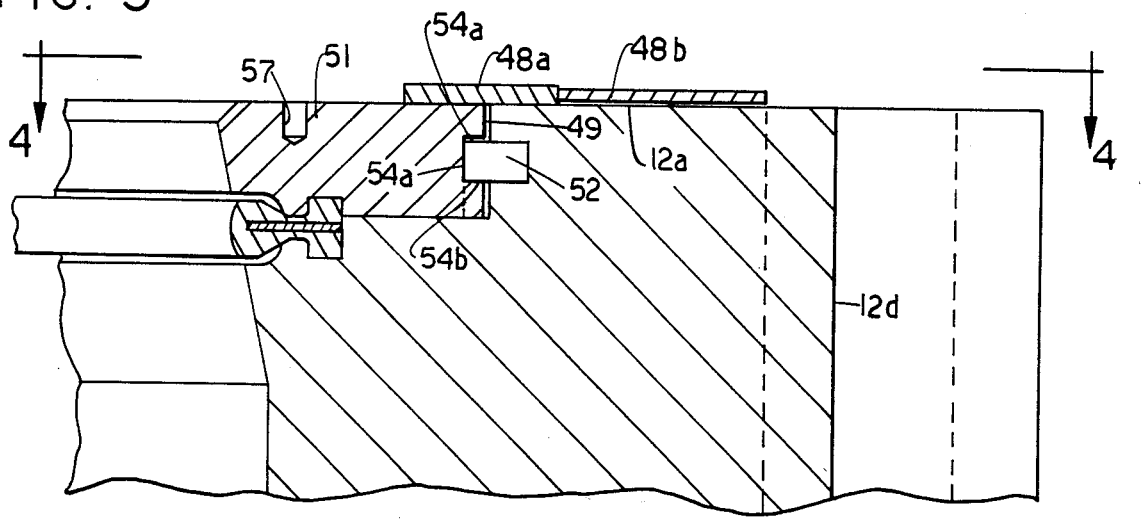
FIG. 3 is a fragmentary cross-sectional view of the valve of FIG. 1, but with a seat retainer and key assembly constructed in accordance with the present invention.

As best illustrated in the cross-sectional depiction of FIG. 3, the keyway 54 is an open sided groove having a bottom wall 54a extending perpendicularly between a pair of parallel sidewalls, an inboard sidewall 54b and an outboard sidewall 54c. Additionally, the improved seat retainer 51 has a peripheral opening 56 formed by the removal of a circumferential sector of the inboard keyway sidewall 54b. The opening 56 is dimensioned to be large enough to axially accommodate the portion of the Woodruff key 52 which extends into the annular keyway 54. Thus, with the opening 56 on retainer ring 51 circumferentially aligned and in registry with the Woodruff key 52, the retainer ring 51 may be axially inserted into the annular recess 24 to position the Woodruff key 52 into the keyway 54. In this position, the axially outboard face of the retainer 51 lies in substantially the same plane as the first axial face 12a of body 12. The retainer 51 may then be rotated to bring the Woodruff key 52 and the opening 56 out of registry. The Woodruff key 52 then engages the annular keyway sidewall 54b, which sidewall 54b is then operative to prevent axial movement of the retainer 51 with respect to the the valve body 12.

As indicated by the fragmentary portion of the improved retainer 51 in FIG. 4, the use of the Woodruff key 52 to secure the retainer 51 to the valve body 12 eliminates the need for the securement screws 30 used in the prior art retainer ring 26 of FIG. 1. It necessarily follows that the screw apertures 27 may also be eliminated, and that the retainer 51 may have an uninterrupted gasket face, free from the troublesome aperture voids. Thus, the spiral wound portion 48a of gasket 48 may be placed in overlying relationship with the retainer-valve body interface 49 without concern that the metal spirals will collapse and create external leak paths.

Furthermore, the Woodruff key 52, keyseat 50 and annular keyway 54 are all entirely internal with respect to the valve body-retainer structure and do not provide any external leak paths. Moreover, inasmuch as the retainer 51 is not ordinarily subjected to forces which would tend to rotate the retainer 51 relative to the body 12, the retainer is safely secured against dislodgement from the valve body 12 by the transmitted interface force between the closure 16 and seat member 20 during bench testing of the valve 10. Optionally, an anti-rotational mechanism, such as a small roll pin axially extending between the retainer 51 and the body 12 may be used to positively avoid any rotation of the retainer 51 relative to the body 12 which could bring the notch opening 56 into registry with the Woodruff key 52.

It will be appreciated by those skilled in the art that while it is possible to securely mount the retainer in an analogous manner by radially outwardly extending keys on the retainer received by a keyway in the valve body, the required opening in the keyway (corresponding in function to opening 56 of the preferred embodiment) in such designs would create a void in the sealing face of the valve body. Hence, in effect, the troublesome void would merely be transferred from the retainer to the valve body.

FIGS. 3 and 4 further depict a rotational hole 57 formed in the face of retainer 51. A similar, but non-illustrated rotational hole is spaced approximately 180 degrees about the face of retainer 51. These rotational holes 57 receive pins from a spanner wrench and are used to rotate the retainer 51 to bring the notch opening 56 into and out of registry with the Woodruff key 52. Additionally, as shown in FIG. 4, the retainer face side of the valve body 12 has a pair of punch marks 59 and 61 at circumferentially spaced locations about the bore 14. These punch marks 59,61 are arranged to cooperate with one of the rotational holes 57 to provide a visual indication as to whether or not the keys 52 have the retainer 51 locked into securement with the body 12. As illustrated in FIG. 4, alignment between rotational hole 57 and the punch mark 59 visually indicates that the retainer 51 is in an open or unsecured position whereas alignment between rotational hole 57 and punch mark 61 visually indicates that the retainer 51 is in a locked or secured position. Alternately, it may be preferable to arrange and space the rotational holes 57 on the retainer 51 such that the rotational holes 57 are aligned with the shaft 18 when the openings 56 are in registry with the keys 52. In this way, alignment of the rotational holes 57 with the shaft 18 will give a visual indication that the retainer 51 is in an unsecured position. Contrastingly, misalignment of the rotational holes 57 with the shaft 18 provides a visual indication that the retainer is secured against axial dislodgement.

Figure 5:
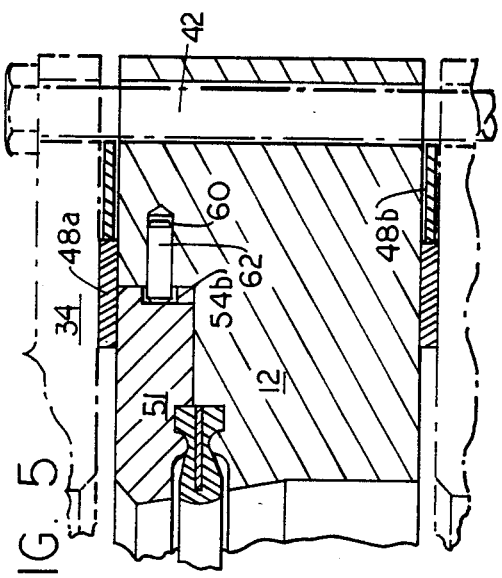
FIG. 5 is a cross-sectional view similiar to FIG. 2 showing a valve interposed between a pair of flanges and illustrating a further embodiment of the invention.
Figure 6:
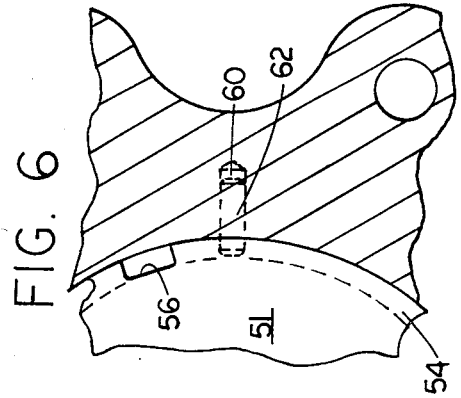
FIG. 6 is an elevational view, taken in cross-section, of the valve of FIG. 5.

A further embodiment of the invention is shown in FIGS. 5 and 6. In this embodiment, a plurality of spaced cylindrical seats 60 are drilled into the cylindrical sidewall 28b of the annular recess 24. A corresponding plurality of keys, in the form of cylindrical pins 62, are fitted in the seats 60 and extend radially inwardly into the annular recess 24. The keys (or pins) 62 are received in the annular keyway 54 of seat retainer 51 in the same manner as the Woodruff key 52 in the embodiment of FIGS. 3 and 4. The keys 62 thus engages the axial inboard sidewall 54b to prevent the retainer 51 from axially dislodging from the valve body 12. As in the embodiment of FIGS. 3 and 4, the retainer 51 has circumferential openings 56 in the axially inboard sidewall 54a. These openings 56 are initially aligned during assembly with the keys 62, and the retainer 51 is axially inserted into the annular recess 24 to bring the keys 62 into the keyway 54. The retainer 51 is then rotated with respect to the valve body 12 to move the openings 56 out of registry with the keys 62 and to lock the retainer 51 in place.

The embodiment of FIGS. 3 and 4 offers manufacturing advantages over the embodiment of FIGS. 5 and 6. This latter mentioned embodiment requires a right angle drilling head for drilling the keyseat 60. In addition to the relatively high costs associated with a right angle head, such heads are physically bulky and will not fit into the bore 14 for smaller valve sizes. In contrast, Woodruff key cutters are substantially less expensive and commonly used with the appropriate machine tools. Furthermore, Woodruff key cutters are substantially smaller than right angle drilling heads in physical size and easily fit into even relatively small valve bores.

It is possible, as is most readily apparent from FIG. 6, to drill the seat 60 radially inwardly through the valve body 12 from the outside. However, such a technique produces an external flowpath for the controlled fluid media and seriously compromises the sealing integrity of the valve 10. It is possible to weld an externally drilled seat hole. But, in addition to necessitating an additional manufacturing step, welding of valve bodies frequently does not provide fluid tight sealing.

It will also be appreciated by those skilled in the art that the key type securement system used in the above described embodiments advantageously secures the retainer to the valve body at a location proximal to the location at which the resultant force exerted against the retainer from the closure of disc 16 is applied against the retainer 51. As a result, the retainer is not subjected to substantial bending moments and does not tend to deflect excessively during valve closure.

In summary, numerous benefits have been described which result from employing the concepts of the invention. The valve provides a recessed retainer with a full uninterrupted face for interfacing with a gasket. Advantageously, the retainer face is suitable for use with a spiral wound type gasket. A spiral wound type gasket is highly preferred in many applications, especially when the fluid media being handled by the valve is toxic or corrosive or under extreme temperatures or pressures. The use of an entirely internally disposed key system between the retainer and the valve body securely, but releasably, holds the retainer to the valve body and prevents sudden axial dislodgement of the retainer relative to the valve body during bench testing of the valve. Furthermore, the securement is achieved without introducing external fluid leakpaths. Thus, the potential danger of the retainer becoming a lethal projectile is eliminated while the sealing integrity of the valve is preserved. Moreover, the retainer is secured to the valve body at a location proximal to the location at which the resultant force applied against the retainer from the valve seat-closure member interface force is applied. Thus, the retainer is not subjected to the excessive bending moments as in the prior art designs and does not tend to deflect excessively from the transmitted closing force of the closure member.

The foregoing description of preferred embodiments of the invention has been presented for purposes of illustration and description. It is not intended to be exhaustive or to limit the invention to the exact form disclosed. Obvious modifications or variations are possible in light of the above teachings. The embodiments were chosen and described to best illustrate the principles of the invention and its practical application to thereby enable one of ordinary skill in the art to best utilize the invention in various modifications as are best suited to the particular use contemplated. It is intended that the scope of the invention be defined by the claims appended hereto.

We claim:

1. A valve for minimizing fluid leakage at an interface with an adjacent fluid handling component, comprising:
    (a) a valve body having first and second axial ends with a fluid flow passage extending therethrough from one axial side to the other, said valve body having an annular recess in the first axial side, said annular recess circumscribing said fluid flow passage and including an axial end wall and a cylindrical sidewall;
    (b) a closure member movable in said valve body between open and closed positions for selectively blocking fluid flow through said fluid flow passage;
    (c) a valve seat disposed in said annular recess about said fluid flow passage, said valve seat being sealingly engageable with said closure member when said closure member is in the closed position;
    (d) a seat retainer selectively secureable in said annular recess, said valve seat being interposed between said seat retainer and said valve body, said seat retainer having an axial end wall and a cylindrical sidewall, the cylindrical sidewall having an annular keyway at least partially defined by an axially outboard keyway sidewall and an axial inboard keyway sidewall;
    (e) a closed ended keyseat formed in the cylindrical sidewall of the annular recess; and
    (f) at least one key member disposed in the keyseat and extending radially inwardly from the cylindrical sidewall of the annular recess into said annular keyway for holding said seat retainer in said annular recess and securing said valve seat relative to said valve body, the axially inboard keyway sidewall having a circumferential opening dimensioned to axially receive the portion of the key member extending into the annular recess, said axially inboard keyway sidewall further being adapted for engagement with the axial sidewall of the annular recess, said at least one key member being mounted in the annular recess without creatng an external leak path for a fluid media in said fluid flow passage.

2. A valve as recited in claim 1 wherein the key member is a Woodruff key and the keyseat has a semi-circular configuration.

3. A valve as recited in claim 1 wherein the first axial side of the valve body is substantially planar and the axially outboard side of the seat retainer lies in substantially the same plane as the first axial side of the valve body when the key member is disposed in the annular keyway.

4. A valve as recited in claim 3 wherein the seat retainer has a ring-like configuration and the axially outboard side of the seat retainer is uninterrupted by aperture voids.

5. A valve as recited in claim 1 wherein the key member has a cylindrical configuration and the keyseat is a closed ended cylindrical bore extending radially into the valve body.

6. A method of securing a recessed seat retainer in an annular recess of a butterfly valve, comprising the steps of:
   (a) forming a closed ended keyseat in the annular recess so that the keyseat opens only to the annular recess;
   (b) placing a key in the keyseat and extending the key into the annular recess;
   (c) forming an annular keyway in the seat retainer;
   (d) removing a circumferential portion of a keyway sidewall to provide an opening for inserting the key into the keyway;
   (e) aligning the seat retainer relative to valve body to bring the opening in the keyway sidewall in registry with the key;
   (f) axially moving the seat retainer relative to the annular recess to position the key in the keyway and to engage a valve seat between the seat retainer and the valve body; and
   (g) after the key and key opening are in registry with the key in the keyway, rotating the seat retainer relative to the valve body to bring the key opening out of alignment with the key and securing the seat and seat retainer from axial dislodgement from the valve body.

7. A method as recited in claim 6 wherein the keyseat is formed in a circumferential sidewall of the annular recess and the key extends radially into the annular recess.

8. A method as recited in claim 7 wherein the keyseat is semi-circular and the key is a Woodruff key.

9. A valve for minimizing fluid leakage at an interface with an adjacent fluid handling component comprising:
   (a) a valve body having first and second axial sides with a fluid flow passage extending therethrough from one axial side to the other, said valve body having an annular recess in the first axial side, said annular recess circumscribing the fluid flow passage and including an axial end wall and a cylindrical sidewall;
   (b) a closure member movable in said valve body between open and closed positions for selectively blocking fluid flow through said fluid flow passage;
   (c) a valve seat disposed in said annular recess about said fluid flow passage, said valve seat being sealingly engageable with said closure member when said closure member is in the closed position;
   (d) a seat retainer selectively secureable in said annular recess, said valve seat being interposed between said seat retainer and said valve body, said seat retainer having a pair of substantially planar and parallel axial end surfaces and a cylindrical side surface said pair of axial end surfaces being axially spaced by a distance approximately equal to the axial dimension of the sidewall of the annular recess so that one of said pair of axial end surfaces is in substantially co-planar relationship with said first axial side of the valve body when the other of the pair of axial end surfaces engages the axial end wall of the annular recess, one of the seat retainer walls having an annular keyway; and
   (e) a closed ended keyseat formed in the cylindrical sidewall of the annular recess;
   (f) at least one key member disposed in the keyseat axially spaced from the first axial side of the valve body and extending from a wall of the annular recess into the annular keyway for holding said seat retainer in said annular recess and securing said valve seat relatively to said valve body, said at least one key member being rigidly secured against radial movement and mounted in the annular recess without creating an external leak path for a fluid media in said fluid flow passage.

* * * * *